(12) United States Patent
Schnarrenberger

(10) Patent No.: US 9,989,839 B2
(45) Date of Patent: Jun. 5, 2018

(54) LIGHT MODULE FOR A PROJECTION OR ILLUMINATION ARRANGEMENT

(71) Applicant: OSRAM GmbH, Munich (DE)

(72) Inventor: Martin Schnarrenberger, Berlin (DE)

(73) Assignee: OSRAM GMBH, Munich (DE)

( * ) Notice: Subject to any disclaimer, the term of this patent is extended or adjusted under 35 U.S.C. 154(b) by 170 days.

(21) Appl. No.: 14/951,517

(22) Filed: Nov. 25, 2015

(65) Prior Publication Data

US 2016/0161835 A1   Jun. 9, 2016

(30) Foreign Application Priority Data

Dec. 4, 2014   (DE) .................. 10 2014 224 934

(51) Int. Cl.
| | |
|---|---|
| *G03B 21/20* | (2006.01) |
| *G02B 26/00* | (2006.01) |
| *G02B 27/14* | (2006.01) |
| *G02B 27/28* | (2006.01) |
| *G02F 1/01* | (2006.01) |
| *G03B 33/00* | (2006.01) |

(52) U.S. Cl.
CPC ......... *G03B 21/206* (2013.01); *G02B 26/008* (2013.01); *G02B 27/141* (2013.01); *G02B 27/283* (2013.01); *G02F 1/0136* (2013.01); *G03B 21/204* (2013.01); *G03B 21/2073* (2013.01); *G03B 33/00* (2013.01); *G03B 21/208* (2013.01); *G03B 21/2066* (2013.01)

(58) Field of Classification Search
CPC ........ G02B 26/00; G02B 27/14; G02B 27/28; G02F 1/01; G03B 33/00; F21V 13/12; F21V 9/10; F21V 9/14; F21K 2/00
See application file for complete search history.

(56) References Cited

U.S. PATENT DOCUMENTS

2013/0010264 A1*   1/2013   Takahashi ............ H04N 9/3114
                                                       353/20

* cited by examiner

*Primary Examiner* — Sultan Chowdhury
*Assistant Examiner* — Danell L Owens
(74) *Attorney, Agent, or Firm* — Viering Jentschura & Partner MBB

(57) ABSTRACT

A light module includes an excitation radiation source designed to emit an excitation radiation having a polarization, at least one first phosphor, an output, at which an output signal is providable, at least one first polarization beam splitter, a first polarization modulator arranged serially between the radiation source and the first splitter. The first modulator is designed to modify the polarization of the radiation source depending on a control signal. The first splitter is designed to split the radiation incident on it depending on the polarization between a first and a second of two optical partial paths connected in parallel with one another. The first optical partial path includes the at least one first phosphor and ends at the output of the light module. The second optical partial path, whilst bypassing the at least one first phosphor, ends at the output of the light module.

15 Claims, 2 Drawing Sheets

LIGHT MODULE FOR A PROJECTION OR ILLUMINATION ARRANGEMENT

CROSS-REFERENCE TO RELATED APPLICATION

This application claims priority to German Patent Application Serial No. 10 2014 224 934.1, which was filed Dec. 4, 2014, and is incorporated herein by reference in its entirety.

TECHNICAL FIELD

Various embodiments relate generally to a light module for a projection or illumination arrangement including an excitation radiation source, which is designed to emit an excitation radiation having a predefinable polarization, at least one first phosphor, which is designed to convert the excitation radiation into a first conversion radiation, an output, at which an output signal is providable which includes at least in phases the first conversion radiation and/or the excitation radiation, and at least one first polarization beam splitter.

BACKGROUND

Generally, various embodiments relate, for example, to light modules for projection or illumination arrangements in which so-called pump light—referred to hereinafter as excitation radiation—from a laser is firstly both used itself (i.e. without conversion) and is directed onto a phosphor, in order to use the light converted by the phosphor. Conventional light modules include a phosphor wheel having, on the one hand, segments coated with phosphor, and having, on the other hand, segments having a slot or a mirror. Depending on whether the pump light impinges on a segment having a phosphor or on a segment having a slit or a mirror, converted light or pump light is guided to the output of the light module.

What is disadvantageous about such conventional light modules is the fact that the transition from a first color to a second color is substantially dependent on the transition from the phosphor to the slot or mirror element on the phosphor wheel. Conventionally, the transition from one segment to another segment is 8°, for example. Relative to a phosphor wheel with 360° which is operated at a frequency of 120 Hz, switching times of just 0.2 ms result. This adversely affects the imaging quality of such a light module. Moreover, the ratio of the individual colors is fixedly predefined by the choice of a phosphor wheel and cannot be changed during the operation of the light module.

SUMMARY

A light module includes an excitation radiation source designed to emit an excitation radiation having a polarization, at least one first phosphor, an output, at which an output signal is providable, at least one first polarization beam splitter, a first polarization modulator arranged serially between the radiation source and the first splitter. The first modulator is designed to modify the polarization of the radiation source depending on a control signal. The first splitter is designed to split the radiation incident on it depending on the polarization between a first and a second of two optical partial paths connected in parallel with one another. The first optical partial path includes the at least one first phosphor and ends at the output of the light module. The second optical partial path, whilst bypassing the at least one first phosphor, ends at the output of the light module.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
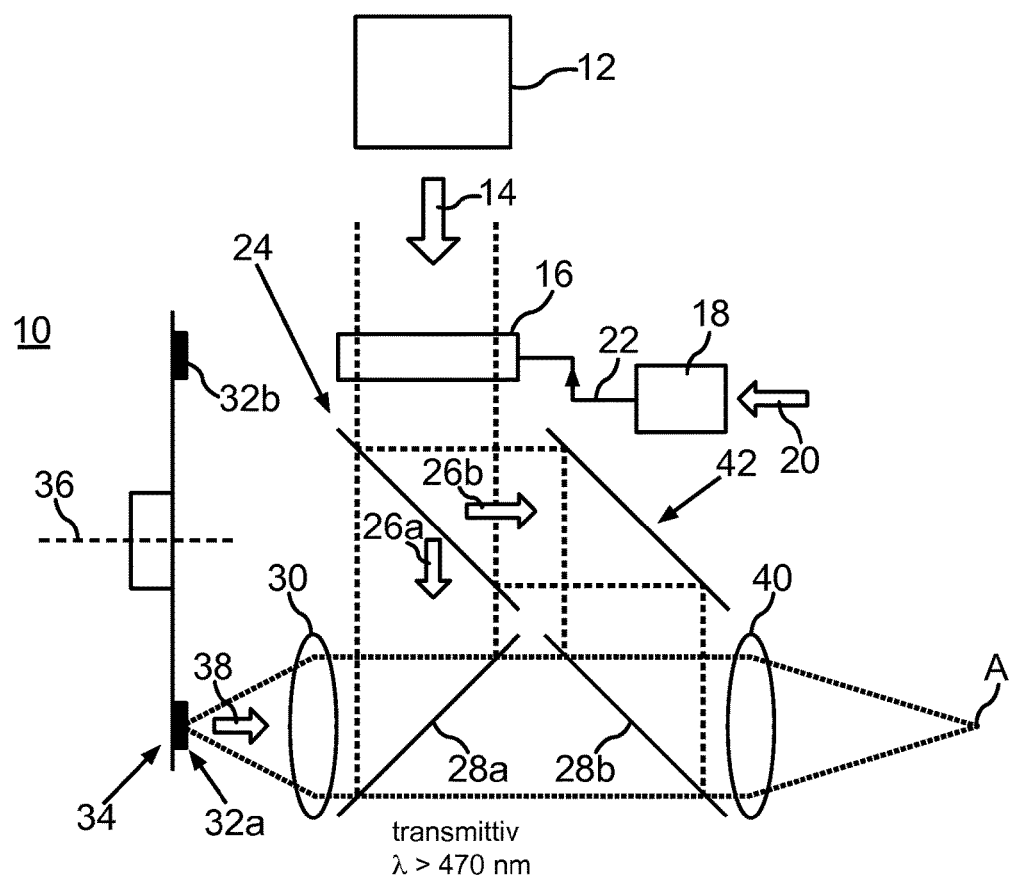
FIG. 1 shows a first embodiment of a light module in schematic illustration.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Various embodiments develop a light module mentioned in the introduction in such a way that, in principle, the possibility is provided of varying the composition of the output signal as desired during the operation of the light module. Moreover, faster transitions from one color to another are intended to be made possible.

Various embodiments are based on the insight that the above can be achieved if a polarization modulator drivable by means of a control device is provided, with which polarization modulator the radiation components having a different polarization can be varied independently of a rotation of the phosphor wheel. By means of a corresponding arrangement of a polarization beam splitter, the light can then be processed further in different ways. In this regard, the light can be guided to the output without being altered, or via at least one phosphor. Provision can also be made for feeding the light to different phosphors, and optionally furthermore providing it at the output without being altered.

What may be provided is the fact that faster changes between excitation radiation and conversion radiation can be obtained by means of a light module according to various embodiments, since the switching speed is now dependent on the switching speed of the polarization modulator and is no longer dependent on the transition from the phosphor to the slot or minor element on the phosphor wheel. In the case of a light module according to various embodiments, switching times of less than 0.05 ms can be obtained without problems. On account of the higher switching speed, fewer losses than in known light modules arise. Moreover, the light module can be operated with higher switching frequency, which counteracts the color breaking effect. The latter may conventionally have the consequence that an observer, upon moving an eye, can discern a breaking up of the projection or illumination beam into different colors at which a white area is actually projected.

Moreover, the procedure according to various embodiments may make it possible to realize a light module which can be operated with extremely little noise. If a slot is provided in the phosphor wheel in the prior art, then the resultant turbulences may generate an undesirably high noise level. If the slot is glazed, then this results in undesirably high production costs.

A light module according to various embodiments therefore may furthermore include a first polarization modulator, which is arranged serially between the excitation radiation source and the first polarization beam splitter. The first polarization modulator is designed to modify the predefinable polarization of the excitation radiation source depending on a control signal. The first polarization beam splitter is designed to split the radiation incident on it depending on the polarization between a first and a second of two optical partial paths connected in parallel with one another. The first optical partial path includes the at least one first phosphor and ends at the output of the light module. The second optical partial path, whilst bypassing the at least one first phosphor, ends likewise at the output of the light module. In this case, the second optical partial path can be embodied in such a way that the excitation radiation is provided at the output. Alternatively or additionally, it may also include at least one second phosphor, such that additionally conversion radiation generated by the second phosphor is providable at the output of the light module.

In this way, by means of corresponding driving of the polarization modulator, the light can be split as desired between first and second optical partial paths, such that it is possible to vary the proportion of the light provided via the first optical partial path in relation to the light provided via the second optical partial path. It is thus possible to change for example the point in time and the duration of the light provided by the first and second optical partial paths, that is to say for example the duration of the excitation radiation and the duration of the light converted by the first phosphor per unit time, e.g. by means of software and thus during the operation of the light module. Moreover, it is possible to increase the proportion of one color at the expense of another color. The excitation radiation emitted by the excitation radiation source is thus used in a higher percentage for the illumination or projection application in comparison with the conventional one, which results in a high efficiency of a light module according to various embodiments.

The polarization modulator used is, for example, a liquid crystal that can rotate the polarization of the light by up to 90° depending on the electrical voltage applied to it. Depending on the rotation of the polarization, the light is guided to a greater or lesser extent into the first or second optical partial path, from where the light is then guided to the output. A synonymous term for polarization modulator is polarization rotator.

In various embodiments, the light module may furthermore include the series connection of a second polarization modulator and of a second polarization beam splitter, which series connection is arranged in the second optical partial path serially with respect to the first polarization beam splitter; and at least one second phosphor, wherein the second polarization beam splitter is designed to split the radiation incident on it depending on the polarization into two further optical partial paths connected in parallel with one another. One of the two further optical partial paths may include the at least one second phosphor and ends at the output of the light module. The other of the two further optical partial paths, whilst bypassing the at least one second phosphor, ends at the output of the light module. The last-mentioned optical partial path may thus either include a third phosphor, but it can also be embodied without a phosphor, with the result that the excitation radiation is provided at the output of the light module. In this way, the composition of the output signal can be varied as desired even with the use of more than one phosphor.

In various embodiments, the light module may include at least one further series connection of a polarization modulator and of a polarization beam splitter, which at least one further series connection is arranged in at least one of the further optical partial paths, and at least one further phosphor. The further polarization beam splitter may be designed to split the radiation incident on it depending on the polarization into two further optical partial paths connected in parallel with one another. One of said further optical partial paths may include the at least one further phosphor and ends at the output. The other further optical partial path, whilst bypassing the at least one further phosphor of the partial path connected in parallel, ends at the output of the light module. As is evident to the person skilled in the art, this principle can be extended to as many phosphors as desired, such that a precise setting of a desired color locus is made possible at the output.

As already mentioned briefly, the optical partial path which, whilst bypassing an optical partial path including a phosphor, ends at the output may either itself include at least one phosphor or include no phosphor. In the first case, conversion radiation provided by the at least one phosphor is additionally provided at the output; in the second case, excitation radiation is provided at the output at any rate.

The light module preferably furthermore includes a control device, which is designed to provide the respective control signal to the respective polarization modulator. In this way, the composition of the output signal can be controlled or regulated particularly precisely.

In this context, the control device can be designed to derive the respective control signal from a signal which represents an image content to be projected. In other words, the composition of the output signal is controlled directly via the image content to be projected. A light module according to various embodiments may enable the variation of the output signal depending on the image content to be projected. The image content to be projected can thus be rendered with particularly high color fidelity. By way of example, in a light module according to various embodiments, the power output by the light module in the blue wavelength range can be increased when representing a blue sky.

It may be provided that at least one dichroic minor designed to be reflective for excitation radiation and transmissive for conversion radiation, or vice versa, is arranged in the optical partial paths including a phosphor serially with respect to the respective polarization beam splitter. In this way, the radiation that excites the phosphor and the radiation emitted by the phosphor can be separated from one another in a simple manner.

In this context, it may furthermore be provided that at least one dichroic mirror designed to be reflective for excitation radiation or transmissive is arranged in the optical partial path including no phosphor serially with respect to the respective polarization beam splitter. The respective embodiment depends on how the rest of the elements of the light module are arranged with respect to one another. The aim at any rate is to achieve a combination of the light coming from the at least one phosphor with the excitation radiation or the conversion radiation coming from a further phosphor. Depending on the embodiment, in this case at least one further dichroic minor can be provided, wherein the at least one further dichroic minor is arranged to combine the light of different partial paths.

In various embodiments which use only one phosphor, with the aim of a particularly compact arrangement, a further mirror, e.g. a dichroic minor, can be provided in one of the optical partial paths, said mirror being designed to be reflective for the radiation guided in the respective optical partial path.

The at least one first phosphor and/or the at least one second phosphor can be arranged in static fashion, but they can also be arranged in movable fashion, e.g. on a color wheel.

In the last-mentioned case, the light module includes at least one color wheel, on which the respective phosphor is arranged, e.g. a multiplicity of phosphors.

The at least one color wheel includes a multiplicity of segments on which the respective phosphor is arranged, e.g. the multiplicity of phosphors, wherein no segment has a through opening or a window in the color wheel.

FIG. 1 shows a light module 10 according to various embodiments in schematic illustration, which light module can be used for a projection or illumination arrangement. The light module 10 includes an excitation radiation source 12, which may include e.g. one or a plurality of laser diodes. Laser diodes which emit radiation in the blue wavelength range, that is to say between 400 nm and 480 nm, may be used. The excitation radiation 14 emitted by the excitation radiation source 12 impinges on a polarization modulator 16, which may be realized as a liquid crystal. The polarization modulator 16 is coupled to a control device 18, to which a signal 20 is fed which is correlated with an image content to be projected. The control device 18 is designed to modify the predefinable polarization of the excitation radiation 14 depending on the image content 20 by means of a control signal 22. The polarization modulator 16 is designed, for example, to vary the polarization between 0° and 90° depending on the control signal 22.

In the beam path downstream of the polarization modulator 16 there follows a polarization beam splitter 24, which is designed to split the radiation incident on it depending on the polarization between a first optical partial path, designated by 26a, and a second optical partial path, designated by 26b. The two partial paths 26a, 26b are connected in parallel with one another.

In the optical partial path 26a, the polarization beam splitter 24 is followed by a dichroic minor 28a, which is embodied such that it is transmissive for radiation having a wavelength λ>470 nm. Since the radiation emitted by the excitation radiation source 12 is in the range of approximately 450 nm, the radiation guided in the optical partial path 26a is accordingly reflected at the dichroic minor 28a, passes through a schematically depicted optical system 30, which serves for concentrating the beam, and impinges on a segment—coated with a phosphor 32a—of a phosphor wheel 34, which has further segments coated with phosphors distributed over the circumference. As depicted, the phosphor wheel 34 is mounted rotatably on an axis 36, such that different segments of the phosphor wheel 34 coated with phosphors 32a, 32b reach the focus of the optical system 30 at different points in time. The phosphors 32 arranged on the phosphor wheel 34 can be of different types, different with regard to their conversion radiation, but embodiments in which phosphors 32 of the same type are used are also conceivable. The phosphor wheel 34 substantially serves to ensure that the phosphors 32 are not loaded in a punctiform manner, such that the power fed to the respective phosphor is distributed over a larger area.

The conversion radiation 38 generated by the phosphor substantially has wavelengths above 480 nm, for example. It passes through the optical system 30 in the opposite direction, which results in beam expansion, and likewise passes through the dichroic mirror 28a since the latter is transmissive in this wavelength range. It passes through a further dichroic minor 28b, which is likewise embodied such that it is transmissive for a radiation in the wavelength range λ>470 nm, and a further optical system 40 serving for beam concentration, and is subsequently provided at the output A of the light module 10.

The light in the second optical partial path 26b is reflected at a minor 42, which can also be embodied as a dichroic mirror, impinges on the dichroic mirror 28b, which is embodied such that it is reflective in the wavelength range of the excitation radiation, impinges on the optical system 40 and is likewise provided at the output A.

The proportions in the first optical partial path 26a and in the second optical partial path 26b can be modified as desired by means of variation of the polarization of the excitation radiation 14 by means of the polarization modulator 16. Particularly fast switching from providing only conversion radiation at the output A to providing only excitation radiation at the output A, and vice versa, is made possible, for example.

Figure 2:
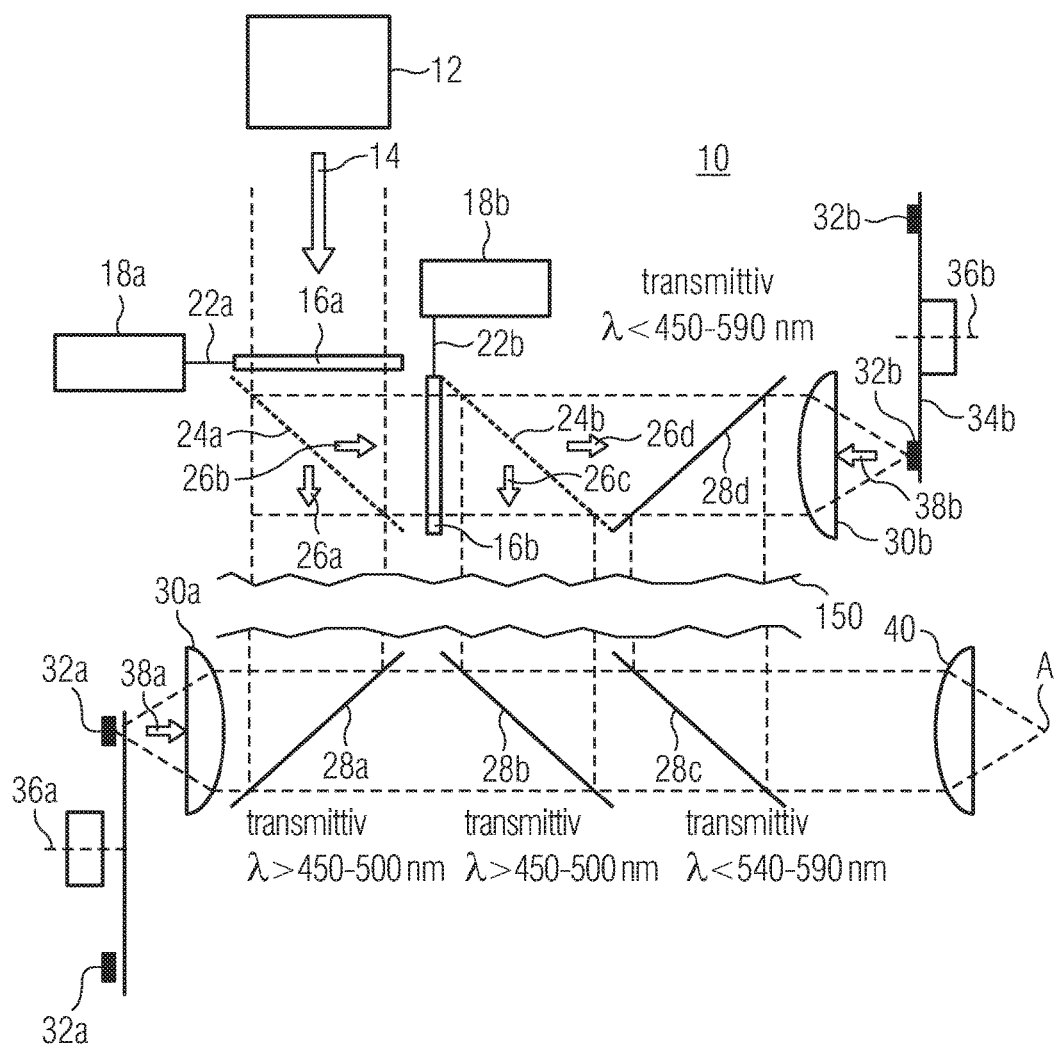
FIG. 2 shows a second embodiment of a light module in schematic illustration.

FIG. 2 shows a second embodiment of a light module 10. Just as in the case of the embodiment illustrated in FIG. 1, the excitation radiation 14 generated by an excitation radiation source 12 impinges on a polarization modulator 16a, which is driven by a control device 18a with a control signal 22a. In the beam path downstream of the polarization modulator 18a, there follows a polarization beam splitter 24a, which, depending on the polarization, splits the signal leaving the polarization modulator 16a into a first optical partial path 26a and into a second optical partial path 26b. The signal in the first optical partial path 26a impinges on a first dichroic mirror 28a, which is embodied such that it is transmissive in a wavelength range λ>450 to 500 nm, that is to say that the limiting frequency is put into this range in an application-specific manner. Since the wavelength of the excitation radiation 14 is in the blue wavelength range, it is reflected at the dichroic mirror 28a, impinges on the optical system 30a and subsequently on a phosphor 32a arranged in a segment of a phosphor wheel 34a rotating about an axis 36a, which phosphor can be designed, for example, to convert the excitation radiation 14 into a conversion radiation 38a in the green wavelength range.

The conversion radiation 38a is then in a wavelength range (λ>450 to 500 nm, for example green to yellow) in which, given appropriate design, the dichroic minor 28a is embodied such that it is transmissive, and passes through said dichroic minor. Two further dichroic minors 28b and 28c are arranged serially with respect to the dichroic mirror 28a. The dichroic minor 28b corresponds to the dichroic minor 28a with regard to its transmission properties, that is to say that it is likewise designed to be transmissive for wavelengths λ in a range of greater than 450 nm to 500 nm. The dichroic minor 28c is likewise designed to be transmissive for wavelengths in a range λ<540 nm to 590 nm. The conversion radiation 38a passes through the dichroic mirrors 28a, 28b and 28c serially, impinges on the optical system 40 and is then provided at the output A.

The radiation passing in the optical partial path 26b impinges on a second polarization modulator 16b, which is driven by means of a control signal 22b via a control device 18b. Both control devices 18a, 18b can be driven via a signal which is correlated with image data to be projected, as illustrated in FIG. 1. A further polarization beam splitter 24b is arranged on the output side of the polarization modulator 16b and splits the optical partial path 26b into two further optical partial paths 26c and 26d. The signal in the optical partial path 26c, which in respect of its wavelength corresponds to the wavelength of the excitation radiation 14, impinges on the dichroic minor 28b, at which it is reflective. The excitation radiation reflected from the dichroic mirror 28b passes through the dichroic mirror 28c, impinges on the optical system 40 and is then subsequently likewise provided at the output A.

The signal in the optical partial path 26d impinges on a further dichroic mirror 28d, which is embodied such that it is transmissive for wavelengths λ<450 to 590 nm. Since the wavelength of the signal in the optical partial path 26d firstly corresponds to the wavelength of the excitation radiation 14, the radiation guided in said optical partial path 26d passes through the dichroic minor 28d, impinges on an optical system 30b and consequently on a phosphor 32b arranged in a segment of a second phosphor wheel 34b mounted rotatably about an axis 36b, which phosphor can be yellow or red, for example. In various embodiments, yellow and red phosphors can also be arranged in a predefined distribution on the phosphor wheel 34b. The excitation radiation 14 converted by the phosphor 32b into conversion radiation 38b (wavelength range for example>580 nm) in turn impinges on the optical system 30b, is then reflected on account of its wavelength at the correspondingly designed dichroic mirror 28d, impinges on the dichroic mirror 28c, is likewise reflected there given corresponding design, passes further from there through the optical system 40 and is likewise provided at the output A.

As is evident to the person skilled in the art, different combinations of the excitation radiation 14, the conversion radiation 38a and the conversion radiation 38b are provided at the output A, e.g. successively or else in different combinations simultaneously.

As is evident to the person skilled in the art, the optical partial path 26c could be split into further optical partial paths 150 by the use of at least one further polarization modulator and corresponding optical elements, in order to enable the output signal at the output A to have further conversion radiation generated by at least one further phosphor.

Even though, in the two embodiments, the phosphors 32 are illustrated as movable on a rotatably arranged color wheel 34, various embodiments can readily also be realized with phosphors arranged in static fashion.

By means of a light module 10 according to various embodiments, the composition of the output signal provided at the output A can be varied as desired during operation in conjunction with extremely short switching times.

One and the same phosphor can be provided on the phosphor wheels 34 illustrated in the embodiments; however it is also possible for different phosphors to be arranged in a manner distributed over the phosphor wheel.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A light module for a projection or illumination arrangement, the light module comprising:
    an excitation radiation source designed to emit an excitation radiation having a predefinable polarization;
    at least one first phosphor designed to convert the excitation radiation into a first conversion radiation;
    an output, at which an output signal is providable which comprises at least in phases at least one of the first conversion radiation or the excitation radiation; and
    at least one first polarization beam splitter;
    a first polarization modulator arranged serially between the excitation radiation source and the first polarization beam splitter, wherein the first polarization modulator is designed to modify the predefinable polarization of the excitation radiation source depending on a control signal;
    wherein the first polarization beam splitter is designed to split the radiation incident on it depending on the polarization between a first and a second of two optical partial paths connected in parallel with one another;
    wherein the first optical partial path comprises the at least one first phosphor and ends at the output of the light module;
    wherein the second optical partial path, whilst bypassing the at least one first phosphor, ends at the output of the light module;
    the series connection of a second polarization modulator and of a second polarization beam splitter, which series connection is arranged in the second optical partial path serially with respect to the first polarization beam splitter; and
    at least one second phosphor;
    wherein the second polarization beam splitter is designed to split the radiation incident on it depending on the polarization into two further optical partial paths connected in parallel with one another;
    wherein one of the two further optical partial paths comprises the at least one second phosphor and ends at the output of the light module;
    wherein the other of the two further optical partial paths, whilst bypassing the at least one second phosphor, ends at the output of the light module;
    at least one further series connection of a polarization modulator and of a polarization beam splitter, which at least one further series connection is arranged in at least one of the further optical partial paths, and at least one further phosphor;
    wherein the further polarization beam splitter is designed to split the radiation incident on it depending on the polarization into two further optical partial paths connected in parallel with one another;
    wherein one of said further optical partial paths comprises the at least one further phosphor and ends at the output;
    wherein the other further optical partial path, whilst bypassing the at least one further phosphor of the partial path connected in parallel, ends at the output of the light module.

2. The light module of claim 1,
    wherein the optical partial path which, whilst bypassing an optical partial path comprising a phosphor, ends at the output comprises a) no phosphor; or
b) at least one phosphor.

3. The light module of claim 1, further comprising:
a control device designed to provide the respective control signal to the respective polarization modulator.

4. The light module of claim 3,
wherein the control device is designed to derive the respective control signal from a signal which represents an image content to be projected.

5. The light module of claim 1,
wherein at least one dichroic mirror designed to be reflective for excitation radiation and transmissive for conversion radiation, or vice versa, is arranged in the optical partial paths comprising a phosphor serially with respect to the respective polarization beam splitter.

6. The light module of claim 5,
wherein at least one dichroic mirror designed to be reflective for excitation radiation or transmissive is arranged in the optical partial path comprising no phosphor serially with respect to the respective polarization beam splitter.

7. The light module of claim 5,
wherein at least one further dichroic mirror is provided;
wherein the at least one further dichroic mirror is arranged to combine the light of different partial paths.

8. The light module of claim 1,
wherein a further mirror is arranged in one of the optical partial paths, said mirror being designed to be reflective for the radiation guided in the respective optical partial path.

9. The light module of claim 8,
wherein the further mirror is a dichroic mirror.

10. The light module of claim 1,
wherein at least one of the at least one first phosphor or the at least one second phosphor is arranged in static fashion.

11. The light module of claim 1,
wherein at least one of the at least one first phosphor or the at least one second phosphor is arranged in movable fashion.

12. The light module of claim 11, further comprising:
at least one color wheel, on which the respective phosphor is arranged.

13. The light module of claim 12,
wherein the at least one color wheel has a multiplicity of segments on which the respective phosphor is arranged;
wherein no segment constitutes a through opening or a window in the color wheel.

14. The light module of claim 11, further comprising:
at least one color wheel, on which a multiplicity of phosphors is arranged.

15. The light module of claim 14,
wherein the at least one color wheel has a multiplicity of segments on which the multiplicity of phosphors is arranged;
wherein no segment constitutes a through opening or a window in the color wheel.

* * * * *

UNITED STATES PATENT AND TRADEMARK OFFICE
CERTIFICATE OF CORRECTION

PATENT NO. : 9,989,839 B2
APPLICATION NO. : 14/951517
DATED : June 5, 2018
INVENTOR(S) : Martin Schnarrenberger Page 1 of 2

It is certified that error appears in the above-identified patent and that said Letters Patent is hereby corrected as shown below:

Column 2, Line 63: Please replace the word "minor" with the word "mirror" between the words "or" and "element".

Column 4, Line 55: Please replace the word "minor" with the word "mirror" after the word "dichroic".

Column 5, Line 7: Please replace the word "minor" with the word "mirror" between the words "dichroic" and "can".

Column 5, Line 8: Please replace the word "minor" with the word "mirror" between the words "dichroic" and "is".

Column 5, Line 12: Please replace the word "minor" with the word "mirror" between the words "dichroic" and "can".

Column 5, Line 53: Please replace the word "minor" with the word "mirror" between the words "dichroic" and "28a".

Column 5, Line 58: Please replace the word "minor" with the word "mirror" between the words "dichroic" and "28a".

Column 6, Line 14: Please replace the word "minor" with the word "mirror" between the words "dichroic" and "28b".

Column 6, Line 20: Please replace the word "minor" with the word "mirror" between the words "a" and "42".

Column 6, Line 57: Please replace the word "minor" with the word "mirror" between the words "dichroic" and "28a".

Signed and Sealed this
Thirty-first Day of July, 2018

Andrei Iancu
*Director of the United States Patent and Trademark Office*

CERTIFICATE OF CORRECTION (continued)
U.S. Pat. No. 9,989,839 B2

Column 6, Line 59: Please replace the word "minor" with the word "mirror" between the words "dichroic" and "Two".

Column 6, Line 59: Please replace the word "minors" with the word "mirrors" between the words "dichroic" and "28b".

Column 6, Line 61: Please replace the word "minor" with the word "mirror" between the words "dichroic" and "28b".

Column 6, Line 62: Please replace the word "minor" with the word "mirror" before the word "28a".

Column 6, Line 65: Please replace the word "minor" with the word "mirror" between the words "dichroic" and "28c".

Column 7, Line 14: Please replace the word "minor" with the word "mirror" between the words "dichroic" and "28b".

Column 7, Line 25: Please replace the word "minor" with the word "mirror" between the words "dichroic" and "28d".